United States Patent
Dessauer et al.

(10) Patent No.: US 6,280,486 B1
(45) Date of Patent: *Aug. 28, 2001

(54) FUEL/WATER EMULSIONS

(75) Inventors: Guido Dessauer, Tutzing; Ute Horn, Dornburg; Helmut Berenbold, Wiesbaden; Gerhard Crass, Friedberg, all of (DE)

(73) Assignee: Clariant GmbH, Frankfurt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/007,459

(22) Filed: Jan. 15, 1998

(30) Foreign Application Priority Data

Jan. 16, 1997 (DE) .................. 197 01 327
Jan. 31, 1997 (DE) .................. 197 03 550

(51) Int. Cl.$^7$ ........................................ C10L 1/32
(52) U.S. Cl. ........................... 44/302; 44/301
(58) Field of Search ............................ 44/302, 301

(56) References Cited

U.S. PATENT DOCUMENTS

| | | | |
|---|---|---|---|
| 2,920,948 | * 1/1960 | Weeks | 44/301 |
| 3,458,294 | 7/1969 | Nixon et al. | |
| 3,490,237 | * 1/1970 | Lissant | 44/301 |
| 3,519,006 | 7/1970 | Simon et al. | |
| 4,246,919 | 1/1981 | McClaflin | |
| 4,294,586 | * 10/1981 | Cox, Jr. | |
| 4,295,859 | * 10/1981 | Boehmke et al. | 44/301 |
| 4,382,802 | * 5/1983 | Blinke | 44/301 |
| 4,395,266 | * 7/1983 | Han | 44/301 |
| 4,570,656 | 2/1986 | Matlach et al. | |
| 5,000,757 | * 3/1991 | Puttock et al. | 44/301 |

FOREIGN PATENT DOCUMENTS

| | | |
|---|---|---|
| 0095823 | 12/1983 | (EP) . |
| 0327353 | 6/1990 | (EP) . |
| 0431357 | 6/1991 | (EP) . |
| 582762 | 2/1994 | (EP) . |
| 205582 | 10/1923 | (GB) . |
| 669037 | 3/1952 | (GB) . |
| WO85/04183 | 9/1985 | (WO) . |
| WO 8804311 | 6/1988 | (WO) . |

OTHER PUBLICATIONS

Foreign Search Report Unknown Date.
Derwent Abstract–WO 85/04183 Unknown Date.

* cited by examiner

*Primary Examiner*—Margaret Medley
(74) *Attorney, Agent, or Firm*—Miles B. Dearth; Scott E. Hanf

(57) ABSTRACT

The present invention relates to fuel/water emulsions essentially comprising 60 to 80% by weight of a fuel, 0.5 to 5% by weight of one or more water-soluble and gasoline-insoluble emulsifiers of the formulae A) $R-O-(CH_2CH_2O)_x-H$ where R is alkyl or alkenyl having in each case 8 to 18 carbon atoms or $C_9-C_{14}$-alkylphenyl and x is a number from 8 to 30, or B) $HO-(C_2H_4O)_x-(C_3H_6O)_y-(C_2H_4O)_z-H$, in which the proportion of the ethylene oxide units is between 40 and 80% by weight of the molecular mass, or

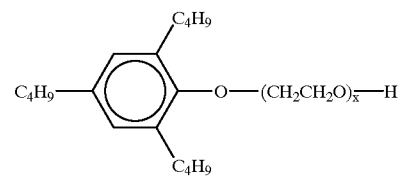

where x is a number between 8 and 30, and 1 to 10% by weight of a water-soluble and gasoline-insoluble poly (alkylene glycol) as stabilizer, also water and, if appropriate, other additives to 100% by weight. The emulsions according to the invention can be used for operating internal combustion engines.

14 Claims, No Drawings

FUEL/WATER EMULSIONS

DESCRIPTION

Fuel/water Emulsions

It is already known in the field of large diesel engines, e.g. as used in shipbuilding, or in that of high-performance internal combustion engines, e.g. for racing cars, to inject water in a controlled manner into the combustion chamber. This achieves improved efficiency and increased knock resistance. The essential advantage of such a water injection is that the discharge of nitrogen oxides is reduced in this manner.

The use of water-containing fuels is disclosed, for example, in GB-A-0669037, GB-A-0205582, EP-A-0 095 823 and WO-88/04311. Said documents teach the use of mixtures of a hydrocarbon, an alcohol and water as an operating substance for internal combustion engines.

EP-A-0 431 357 discloses a method of operating internal combustion engines using water-containing fuels, a catalyst being used in the combustion chamber.

EP-A-0 372 353 discloses the preparation of a fuel/water mixture by means of an electromagnetically operating device.

The object of the present invention is to avoid separate injection of water and the use of catalysts and to develop alcohol-free emulsions which simultaneously contain the fuel and the water in uniform form. This object was achieved by using a special emulsifier and a stabilizer.

The present invention relates to fuel/water emulsions essentially comprising 60 to 80% by weight of a fuel, 0.5 to 5% by weight of one or more water-soluble and gasoline-insoluble emulsifiers of the formulae (A) $R-O-(CH_2CH_2O)_x-H$ 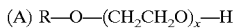

where R is alkyl or alkenyl having in each case 8 to 18 carbon atoms or $C_9-C_{14}$-alkylphenyl and x is a number from 8 to 30, and/or (B) ethylene oxide/propylene oxide block polymers in which the proportion of the ethylene oxide units is between 40 and 80% by weight of the molecular mass, and/or

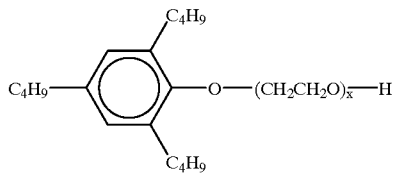

where x is a number between 10 and 30, and 1 to 10% by weight of a water-soluble and gasoline-insoluble poly(alkylene glycol) as stabilizer, also water and, if appropriate, other additives to 100% by weight.

Preferably, 0.5 to 1% by weight, in particular 0.65 to 0.75% by weight, of emulsifier is used. In the case of the compounds mentioned under A), R is preferably alkyl or alkenyl having 12 to 16 carbon atoms or $C_9$-alkylphenyl. x is preferably a number between 9 and 13. In the case of the compounds mentioned under C), x is preferably a number between 9 and 13. The emulsifier is generally commercial ethoxylation products: (A) are ethoxylated fatty alcohols, preferably ethoxylated alkylphenols (®Arkopal, manufactured by Hoechst AG) and (B) are EO/PO-copolymers of the formula

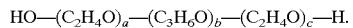

In these block polymers, the indices a, b and c are such that the proportion by weight of EO is 40 to 80%. The numerical values of a, b and c therefore depend on the molecular mass of the block polymers, which is preferably between 2000 and 10,000 units. These copolymers of ethylene oxide (EO) and propylene oxide (PO) are commercially available under the name ®Genapol PF (Hoechst AG). The butylphenol ethoxylates described under C) are marketed under the name ®Sapogenat T (Hoechst AG). $C_4H_9$ is here an n-, iso- or tert-butyl radical. Emulsifiers preferably used are the ethoxylated alkylphenols, of which the ethoxylated nonylphenols are in turn preferred.

The poly(alkylene glycol) used as stabilizer is preferably added in amounts of 1.5 to 5, in particular 2.5 to 3.5, % by weight. Preferred poly(alkylene glycols) are those which contain both ethylene oxide groups and propylene oxide groups, as, for example, the polyglycol B11 types from Hoechst AG. Furthermore, preference is given to using poly(alkylene glycols) which have molecular masses between 1000 and 10,000 units.

The emulsions according to the invention can, in addition, further contain, as further additive, 0.5 to 8, preferably 1.5 to 2.5, % by weight of hydrogen peroxide as biostatic agent. Hydrogen peroxide has the advantage that it supplies additional oxygen for the combustion of the fuel, but other bactericidal, algicidal and fungicidal agents which burn without leaving a residue can also be used. All amounts given in % by weight relate to the entire emulsion.

The fuel used is preferably gasoline for internal combustion engines (for example regular-grade or premium-grade), but other types of fuel can also be used such as diesel oil, naphtha or kerosine. Preference is given to fuel/water emulsions which contain 70–75% by weight of regular-grade or premium-grade gasoline.

The fuel/water emulsions according to the invention can be prepared in various ways. One possibility is to dissolve emulsifier and poly(alkylene glycol) in warm water and to stir this solution into the fuel. The mixture is stirred for a short period and the agitator unit is then switched off, whereupon the mixture separates into two phases. It is then stirred again until the emulsion is homogeneous and sufficiently mobile. It is essential in this process variant that stirring ceases intermittently and the emulsion is allowed to stand briefly.

In the second process variant, emulsifier and poly(alkylene glycol) are likewise dissolved to give a clear solution in water. The fuel is then stirred into this solution and stirring is continued until the emulsion is homogeneous and mobile. The water required to prepare these emulsions is preferably demineralized, in order that no solid residues form when these emulsions are burnt. Suitable equipment for preparing the emulsions according to the invention is all equipment known for this purpose to those skilled in the art, for example high-shear dispersion units (Ultraturrax), ultrasonic dispersers or dispersion disks of the Cowls-mixer type or a Caddy Mill.

The fuel/water emulsions according to the invention are suitable for operating internal combustion engines, in particular direct-injection internal combustion engines.

EXAMPLES

Example 1

3 ml of an ethoxylated nonylphenol (ethylene oxide content 11 mol) and 7 ml of an ethylene oxide/propylene oxide poly(alkylene glycol) having an ethylene oxide/ propylene oxide ratio of 1:1 and a molar mass of 3100 were dissolved in 84 ml of twice-distilled water at 40–45° C. After cooling the mixture to room temperature, 20 ml of $H_2O_2$ (30% strength) were added. 300 ml of regular-grade gasoline were stirred into this solution and the mixture was sheared intensively for 15 minutes. A stable emulsion was obtained.

Example 2

3 ml of the alkoxylated nonylphenol as described in Example 1 and 15 ml of the poly(alkylene glycol) as described in Example 1 were dissolved in 90 ml of twice-distilled water at 40° C. 300 ml of regular-grade gasoline were stirred into this solution at approximately 45° C. using a high-shear mixer (Caddy Mill type) until the viscosity decreases markedly. The temperature increases to approximately 50° C. in the course of this. After cooling the mixture, 20 ml of $H_2O_2$ (30% strength) were added, which caused a further decrease in the viscosity.

The emulsions according to the invention of Examples 1 and 2 have the compositions and properties reported in Table 1:

TABLE 1

(all data in % by weight)

| Constituent/Property | Example 1 | Example 2 |
|---|---|---|
| Water | 30.5 % | 31 % |
| $H_2O_2$ | 2.1 % | 2 % |
| Emulsifier (ethoxylated nonylphenol) | 1 % | 0.9 % |
| Poly(alkylene glycol) | 2.2 % | 4.6 % |
| Gasoline | 64.2 % | 61.5 % |
| Viscosity at 48° C. | 440 mPas. | 330 mpas. |
| Viscosity at 22° C. | 750 mPas. | 650 mPas. |
| Evaporation residue mg/100 ml | 2440 | 4165 |
| Chlorine content | <30 ppm | <30 ppm |

Example 3

10 ml of an ethylene oxide/propylene oxide poly(alkylene glycol) having an ethylene oxide/propylene oxide ratio of 4:1 and a molar mass of 1000 were mixed with 90 ml of softened water (pH 5.0). 3 ml of the alkoxylated nonylphenol as described in Example 1 were added to this mixture, which was heated briefly to approximately 50° C. for improved homogenization. 300 ml of regular-grade gasoline were charged into a separate vessel and by means of a high-speed stirrer, the water/emulsifier mixture was slowly stirred into the gasoline. A white water-in-gasoline emulsion was obtained, which was further stirred for approximately 3 to 5 minutes. The emulsion thus obtained was then allowed to stand until the white water-containing layer which formed on standing had settled to approximately 50% of the total volume. Renewed intensive stirring caused a phase inversion and a stable low-viscosity emulsion was obtained.

An equally good emulsion was obtained using 4 ml of ethoxylated nonylphenol instead of 3 ml.

Example 4

Ethoxylated nonylphenol and poly(alkylene glycol), both as described in Example 1, were successively dissolved in electrolyte-free water at approximately 45° C. This solution was then stirred into the charged gasoline. After stirring for 5 minutes, the batch was allowed to stand, during which two different phases were clearly formed. After 5 minutes the mixture was further stirred until the emulsion became mobile. During the stirring the emulsion heated to approximately 48° C.

Example 5

Water and additives were mixed and heated as in Example 3. The gasoline was then stirred into the charged aqueous solution using an Ultraturrax. The mixture was then further stirred until the emulsion became mobile, without allowing the emulsion to stand in between.

The emulsions described in Examples 4 and 5 have the compositions and properties reported in Table 2:

TABLE 2

| Constituent/Property | Example 4 | Example 5 |
|---|---|---|
| Demineralized water | 60 g | 60 g |
| Ethoxylated nonylphenol | 2 g | 2 g |
| Poly(alkylene glycol) | 3 g | 3 g |
| Regular-grade gasoline | 135 g | 135 g |
| Viscosity at 46° C. (in mPas) | 440 | 330 |
| Viscosity at 22° C. (in mpas) | 750 | 650 |

What is claimed is:

1. A fuel/water emulsion comprising from 0.5 to 8% by weight of hydrogen peroxide, 60 to 80% by weight of Regular or premium grade gasoline, 0.5 to 5% by weight of a mixture of water-soluble and gasoline insoluble emulsifiers of the formulae (A) R—O—$(CH_2CH_2O)_x$—H where R is alkyl or alkenyl having in each case 8 to 18 carbon atoms or $C_9$–$C_{14}$-alkylphenyl and x is a number from 8 to 30, (B) ethylene oxide/propylene oxide block polymers of molecular mass between 2000 and 10,000 units in which the proportion of the ethylene oxide units is between 40 and 80% by weight of the molecular mass, and

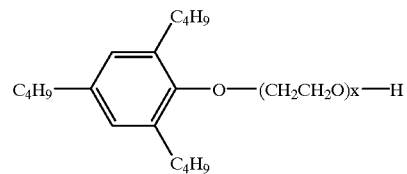

where x is a number between 10 and 30, 1 to 10% by weight of a water-soluble and gasoline-insoluble poly(alkylene glycol) stabilizer of molecular mass between 1000 and 10,000 units, water and, optionally other fuel additives to 100% by weight.

2. A fuel/water emulsion as claimed in claim 1, wherein the content of said emulsifiers are 0.5 to 1% by weight.

3. A fuel/water emulsion as claimed in claim 1, wherein said emulsifier (A) is a nonylphenol ethoxylate having 8 to 30 ethylene oxide units.

4. A fuel/water emulsion as claimed in claim 1, wherein said emulsifier is a nonylphenol ethoxylate having 9 to 13 ethylene oxide units.

5. A fuel/water emulsion as claimed in claim 1, wherein said emulsion contains 1.5 to 5% by weight of a poly(alkylene glycol) stabilizer.

6. The fuel/water emulsion of claim 5 wherein said poly(alkylene glycol) stabilizer is present at from 2.5 to 3.5% by weight.

7. A fuel/water emulsion as claimed in claim 1, wherein said emulsion further contains a bactericide, algicide or fungicide.

8. A fuel/water emulsion as claimed in claim 1, wherein the emulsion contains 70 to 75% by weight of regular-grade or premium-grade gasoline.

9. The fuel/water emulsion of claim 2 wherein said emulsifiers are present at from 0.65 to 0.75% by weight.

10. The fuel/water emulsion of claim 1 wherein said hydrogen peroxide is present at from 1.5 to 2.5% by weight.

11. A process for preparing fuel/water emulsions, comprising the steps of charging an aqueous solution of a mixture of water-soluble and gasoline insoluble emulsifier components (A), (B), and (C), from 0.5 to 8% by weight of hydrogen peroxide and a stabilizer to a mixing zone containing a regular or premium grade gasoline fuel, wherein said emulsifier components are added at a total of from 0.5 to 5% by weight, and wherein said emulsifiers are of the formulae (A) is R—O—(CH$_2$CH$_2$O)$_x$—H where R is alkyl or alkenyl having in each case 8 to 18 carbon atoms or C$_9$–C$_{14}$-alkylphenyl and x is a number from 8 to 30, (B) is an ethylene oxide/propylene oxide block polymer of molecular mass between 2000 and 10,000 units in which the proportion of the ethylene oxide units is between 40 and 80% by weight of the molecular mass, and (C)

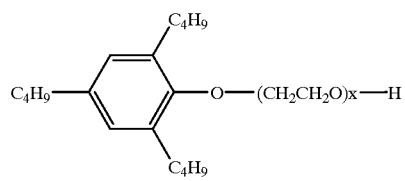

where x is a number between 10 and 30, and wherein said stabilizer is a poly(alkylene glycol) of molecular mass between 1000 and 10,000 units, stirring the mixture followed by ceasing stirring, allowing two phases to form, followed by commencing stirring again and emulsifying the fuel therein.

12. The process as claimed in claim 11, comprising emulsifying the fuel in at least 2 steps which are separated from one another in time.

13. A method for operating an internal combustion engine comprising adding the fuel/water emulsion of claim 1 and combusting said emulsion in said engine.

14. The method of claim 13 wherein said internal combustion engine is a direct-injection internal combustion engine.

\* \* \* \* \*